United States Patent [19]
Whitehouse

[11] Patent Number: 4,603,610
[45] Date of Patent: Aug. 5, 1986

[54] SIZING APPARATUS

[76] Inventor: John A. Whitehouse, 8 Old Rectory Close, Mulbarton, Norwich, England

[21] Appl. No.: 671,516

[22] Filed: Nov. 15, 1984

[30] Foreign Application Priority Data

Nov. 15, 1983 [GB] United Kingdom ............... 8330422

[51] Int. Cl.$^4$ .......................................... B26D 7/30
[52] U.S. Cl. ......................................... 83/13; 83/73;
83/77; 83/368; 83/433; 83/435.2; 83/789;
83/813
[58] Field of Search ..................... 83/73, 71, 77, 359,
83/789, 813, 433, 435.1, 435.2, 368, 13; 177/60;
53/502, 503, 504

[56] References Cited

U.S. PATENT DOCUMENTS

| | | | |
|---|---|---|---|
| 3,378,052 | 4/1968 | Dekker et al. | 83/77 X |
| 3,605,837 | 9/1971 | Lambert et al. | 83/77 |
| 3,733,952 | 5/1973 | Fukugami et al. | 83/789 |
| 4,136,504 | 1/1979 | Wyslotsky | 83/77 X |
| 4,379,416 | 4/1983 | Kuchler | 83/77 X |

*Primary Examiner*—Frank T. Yost
*Attorney, Agent, or Firm*—Oblon, Fisher, Spivak, McClelland & Maier

[57] ABSTRACT

Apparatus and methods for producing uniform pieces of meat or other product when cut or sawn from a non-uniform thickness lump. A band saw or the like is adjustable in position to produce different depths of cut piece under the control of signals produced by a control unit. The control employs a keypad for entering numerically the target weight for the cut pieces and an assumed density value for the product. A display unit displays the numerical values entered. A weighing device checks the weight of each cut piece (or batch multiple cut pieces) to produce the actual weight (or average weight) of the cut piece(s) and the control unit compares the actual or average value with the expected value of weight and adjusts the density value if required. The area of the end face of the product is measured by sampling the height of the end face of the product as it passes a sensor.

11 Claims, 1 Drawing Figure

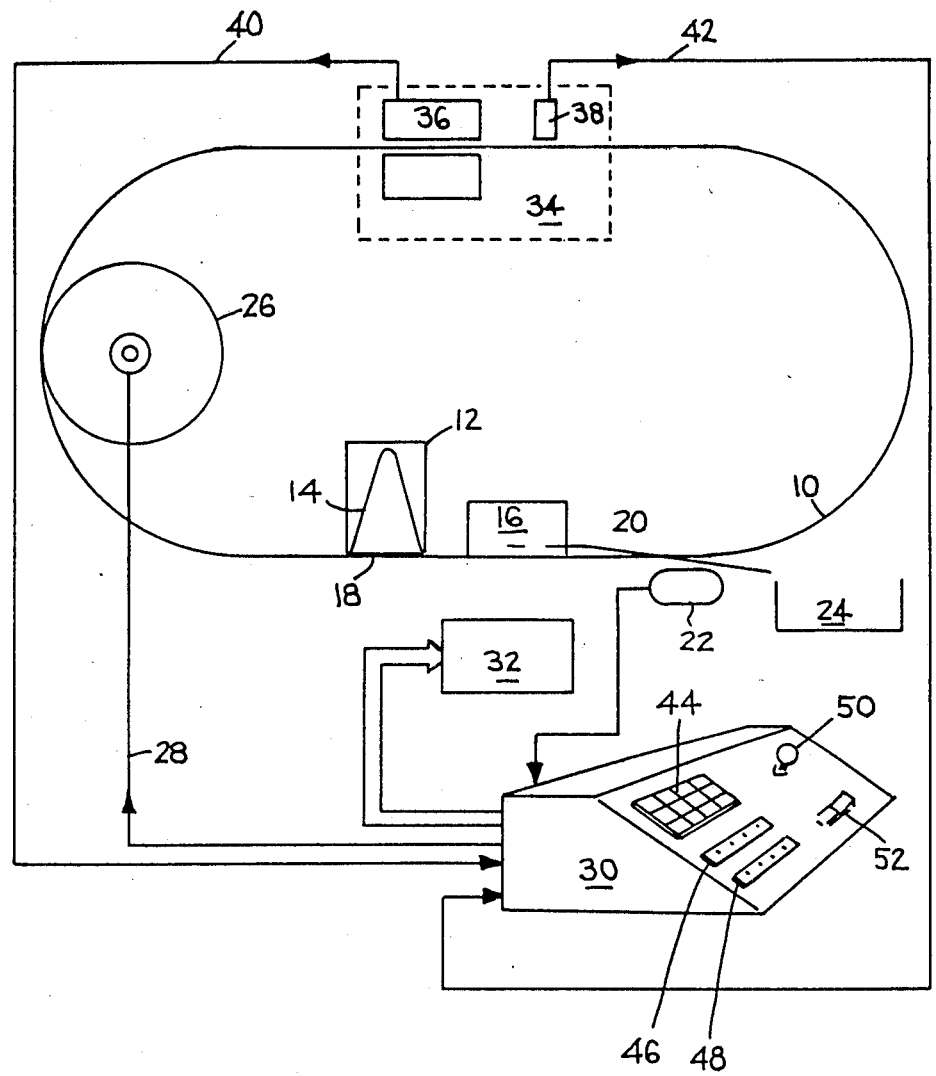

SIZING APPARATUS

FIELD OF INVENTION

This invention concerns apparatus for cutting or sawing a product to size particularly apparatus for cutting or sawing meat to size into uniformed pieces. The invention is not however limited to use with meat.

BACKGROUND TO THE INVENTION

With certain products particularly meat although not exclusively so, it is difficult to keep the weight of cut portions constant. This is particularly the case when dealing with a product such as pork chops.

The present invention seeks to provide apparatus and method for improving uniformity of the size and weight of cut portions of a product such as meat.

SUMMARY OF THE INVENTION

According to one aspect of the present invention apparatus for cutting or sawing a product into uniformly sized portions comprises:

1. means to determine a numerical value for the area of the end face of a region of a product from which pieces are to be cut or sawn,
2. computing means adapted to receive a numerical density value for the material to be cut and a numerical weight value corresponding to the desired weight per cut piece, the computing means being adapted to compute from the measured area of the end face the depth of the cut required to obtain a piece of the desired weight, and
3. means for adjusting the depth of cut using the computer thickness value, to obtain pieces of the desired weight.

The measurement of the area may be by contact with the exposed surface of the product or optically or otherwise.

According to one preferred feature of the invention, the weight of the piece which is cut using the apparatus according to the invention, is measured using a standard weighing machine and the weight is compared with the expected weight and means is provided for feeding back information arising from this comparison to adjust the numerical density value for subsequent computations.

In this way drift in electronic circuitry and/or variation in density of the material to be cut can be accommodated.

According to another preferred feature of the invention the weight of a number (n) of pieces cut from the product (using apparatus according to the invention) may be determined and by assuming a constant area of the cut pieces, an average numerical density value may be computed for use in subsequent depth computations, a new average density value being computed after each (n) cuts.

According to a further preferred feature of the invention, the exposed face of a product is measured in one direction by means of physical contact switches and in a perpendicular direction by means of an optical detector such as an infra red slotted detector.

In one embodiment of the invention comprising apparatus for cutting meat there is provided:

1. a closed loop track,
2. a magazine movable around the track for containing a piece of meat,
3. a vertical band saw adjacent the track,
4. means for determining a cross-sectional area of the exposed surface of the piece of meat at a position around the track different from that at which the band saw is located,
5. computing means for determining from a numerical density value the depth of cut to be made to obtain a desired weight of cut piece, and
6. means responsive to the output of the computing means to vary the depth of cut accordingly, to obtain pieces of similar weight.

According to another feature of the invention a cutting profile memory may be provided either in the form of solid state memory or a punched card or magnetic tape which allows for different weight sections to be cut from a single lump. For example, four ounce chops may be cut from a chump end of a piece of meat whereas six ounce chops would be cut from the loin section.

The measurement of the height of the end face of the lump product such as meat which is to be cut parallel to that face is most simply measured using a vertical line of closely spaced switch actuators which are adapted to be depressed in the presence of the product and which in doing so close a corresponding plurality of switches associated therewith. The height of the product at different points accross the width of the product is thus determined by checking the number of switches which have been closed by the presence of the product at each said point.

Where the product is of irregular cross-section as is generally the case, the number of switches closed at different registrations of the product relative to the line of switches (the line being generally perpendicular to the direction of movement of the product) will vary, and according to a further preferred feature of the invention, the state of the switches is checked at a plurality of positions along the width of the product end face as the latter is moved past the line of switches so that the product height is effectively sampled at a plurality of time intervals. By effectively measuring the height of the product at a large number of different positions across the width of the product, each sampling position being equally spaced from the next, so the product can be thought of as being divided into a plurality of narrow vertical bands each having a height equal to the locally measured height of the product and by summing the bands so a numercial value proportional to the area of the cross-section can be obtained.

According to another aspect of the invention a method of controlling the cutting or sawing of a product into uniformly sized portions comprises the steps of:

1. resetting apparatus for accumulating an area signal to zero
2. entering a target weight for each piece and an assumed density value into a computing means
3. a face of the product from which slices are to be cut is moved accross a detection station so that the height of the end face can be sampled at regular intervals and an area signal accumulated corresponding to a summation of all the individual height signals
4. multiplying the area signal by a constant to give the area of the product, the constant being proportional to the spacing between the sampling points,
5. multiplying the area signal by the density value signal to give the weight of a slice of the product of unit thickness
6. dividing the numerical target weight value by the unit thickness weight value to obtain a numerical value of the thickness of the cut required to obtain the desired target weight 7. generating a control signal proportional to the numerical vlaue of the thickness required 8. adjusting a cutting means to remove from the measured end face of the material a slice having the desired thickness 9. cutting a slice from the said end face of the product having the desired thickness 10. weighing the slice of product to obtain the actual weight of the cut 11. comparing the actual weight with the target weight and producing from the comparison a feedback signal indicating whether the density parameter utilised in the computation of the thickness was correct, and 12. where a correction in the density value is required, updating the density value in the computing means and restoring same for use in subsequent depth of cut computations.

Where the accuracy of the area measurement using a plurality of sample heights is not sufficiently good then a correction to the individual height values may be made using Simson's Rule by storing the individual height values in a buffer memory before accumulation and applying the Simson's Rule correction to the values before accumulating the height values, to obtain a signal more precisely proportional to the area of the end face of the product.

If the vertical spacing of the separate switch actuators cannot be reduced to an acceptable dimension (ie the pitch of the switches is too coarse) then two or more columns of switches may be used each having the same minimum practical spacing or pitch between switch actuators but with relative positions of the actuators in one of the columns being displaced by a fraction of the pitch relative to those in the other column (or columns of switches) so that two or more separate sets of height values can be obtained (with or without tabulation) at an average value obtained for example by summing each of the height values obtained from the separate columns can be used in the area calculation.

Typically two such separate columns of switch actuators and switches are provided with a switch actuator and switches in one column displaced by half a spacing between the actuators and switches in the other column.

Mechanical switches may be used to determine the height of the cross-sectional area and typically Hall-effect switches or microswitches might be employed.

If protection from the product is required (as would probably be the case with a product such as meat) then a sheet of flexible material may be placed between the switch contacts and the product. Typically a sheet of thin flexible plastics material may be employed which can be wiped clean or washed down.

Where the product is moved on a closed path which itself is driven through a non-slip drive, the movement of the product in a direction perpendicular to the direction of height measurement can be obtained by measuring the angular movement of the drive to the product. Where no slip occurs, the angular movement of the drive to the product will be proportional to the linear movement of the product passing the measuring station.

Where the product is moved around a closed path and slip can occur between the drive and the product the actual position of the product must be monitored and movement of the product in the direction perpendicular to the direction of height measurement must be obtained by independent monitoring means.

The invention will now be described by way of example with reference to the accompanying drawing which is a diagrammatic view of a complete weighing and cutting system incorporating the invention.

In the drawing a meat cutting apparatus is shown diagrammatically. The apparatus includes a closed track 10 around which a meat carrying platform 12 is movable. A piece of meat 14 is shown on the movable support 12.

A band saw cutter is located at 16 with a band saw operating vertically to remove a slice of the meat from the end face 18. A guide 20 deflects the cut slice onto a check weighing apparatus 22 and from there the checked pieces are loaded into a bin or onto a conveyor generally designated 24. The movement of the platform 12 around the track 10 is controlled by a drive unit 16 which itself is controlled via a line 28 from a control centre 30.

The position of the band saw relative to the end faces of the meat 14 is likewise adjustable and is controllable by a drive unit shown diagrammatically at 32. By controlling the latter so the position of the band saw relative to the end face of the meat 14 can be adjusted to produce any desired thickness of slice.

In accordance with the invention a scanning device is located around the track 10 at a position generally designated 34. The scanning device includes a Y sensor which determines the height of the cut piece at a series of sampling points along the length of the piece as it passes the scanner and also includes an X sensor for determining the presence of the piece of meat since there is no point in sampling the height when no meat is present.

The Y sensor is designated 36 and the X sensor 38 and as a piece of meat passes the two sensors electrical signals are conveyed along lines 40 and 42 respectively to the control centre 30. The output from 38 is shifted in time so as to occur with the passage of the meat past sensor 36.

The control centre includes a keypad 44 by which numerical values can be entered, digital displays 46 and 48, a stop button 50 and a reset button 52.

The display provides for the continuous display of the target weight (normally entered via the keypad 44). In addition it can be arranged to display the last cut weight (produced from the check weighing apparatus 22).

The numerical value of the density factor to be employed for the first weighing (or first batch of weighings) is also entered via the keypad 44.

In addition the display conveniently provides a percentage error of the last cut weight, ie the actual weight divided by the target weight multiplied by 100.

Additional displays whether permanent or of the type which can be called up allow inter alia for the display of the average weight of the last (n) cut pieces, to allow the operator to determine the average weight of the meat being cut.

In addition there is preferably a data highway port from the control centre 30 to allow the information derived therefrom to be supplied to a computer or other device for storing the record of the production data.

Although not shown in detail the check weighing of each piece may be dispensed with and instead the weight of each n (say 5 or 6) cut pieces is obtained and using the number of pieces and the theoretical volume of meat cut, an updated density value can be obtained. If this is significantly different from the last calculated (or assumed) value of density, this new value can be substituted either automatically or manually for use in the next depth cut computation.

I claim:

1. Apparatus for cutting comprising:
   (1) a closed loop track,
   (2) a magazine movable around the track for containing a piece of meat,
   (3) a vertical band saw adjacent the track,
   (4) means for determining a cross-sectional area of the exposed surface of the piece of meat at a position around the track different from that at which the band saw is located,
   (5) computing means for determining from the measured area and a numerical density value the depth of cut required to obtain a desired weight of cut piece, and
   (6) means responsive to the output of the computing means to vary the depth of cut to obtain pieces of similar weight.

2. Apparatus as set forth in claim 1 wherein the area is measured by contact with the exposed surface of the product.

3. Apparatus as set forth in claim 1 further comprising weighing means for obtaining the weight of each cut piece, means for generating an electrical signal corresponding thereto, comparator means for comparing the actual weight with the target weight and means for feeding back information arising from this comparison to adjust the numerical density value for subsequent computations.

4. Apparatus as set forth in claim 1 further comprising means for weighing each N pieces cut from the product, computing means for deriving from the weight of the N pieces an average numerical density value for use in the next N depth computations.

5. Apparatus as set forth in claim 1 wherein the exposed face of a product is measured in one direction by means of physical contact switches and in a perpendicular direction by means of an optical detector.

6. Apparatus as set forth in claim 1 further comprising a cutting profile memory in the form of any one of a solid state memory, a punched card and magnetic tape, which allows for different weight sections to be cut from a single lump.

7. Apparatus as set forth in claim 1 wherein the area measuring means comprises a vertical line of closely spaced switch actuators which are adapted to be depressed in the presence of the product and which in doing so close a corresponding plurality of switches associated therewith, the height of the product at different points thereon being determined by counting the number of switches which have been closed by the presence of the product at each said point.

8. Apparatus as set forth in claim 7 wherein a sheet of flexible material is placed between the switch actuators and the product.

9. A method of controlling the cutting or sawing of a product into uniformly sized portions comprising the steps of:
   (1) resetting apparatus for accumulating an area signal, to zero;
   (2) entering a target weight for each piece to be cut and an assumed density value of the product into a computing means;
   (3) moving the face of the product from which slices are to be cut around a closed loop track and past a detection station so that the height of the end face can be sampled at regular intervals and an area signal accumulated corresponding to a summation of all the individual height signals;
   (4) multiplying the area signal by a Constant to give the area of the end face of the product, the Constant being proportional to the spacing between the sampling points;
   (5) multiplying the area signal by the density value signal to give the weight of a slide of the product of unit thickness;
   (6) dividing the numerical target weight value by the unit thickness weight value to obtain a numerical value of the thickness of the cut required to obtain the desired target weight;
   (7) generating a control signal proportional to the numerical value of the thickness required;
   (8) adjusting a cutting means to remove from the measured end face of the material a slide having the desired thickness;
   (9) cutting a slice from the said end face of the product having the desired thickness;
   (10) weighing the slice of product to obtain the average weight of the cut pieces;
   (11) comparing the average weight with the target weight and producing from the comparison a feedback signal indicating whether the density parameter utilized in the computation of the thickness was correct, and
   (12) where a correction in the density value is required, updating the density value in the computing means and restoring the same for use in subsequent depth-of-cut computations.

10. A method of controlling the cutting or sawing of a product into uniformly sized portions comprising the steps of:
    (1) resetting apparatus for accumulating an area signal to zero;
    (2) entering a target weight for each piece to be cut and an assumed density value of the product into a computing means;
    (3) moving the face of the product from which slices are to be cut around a closed loop track and past a detection station so that the height of the end face can be sampled at regular intervals and an area signal accumulated corresponding to a summation of all the individual height signals;
    (4) multiplying the area signal by a Constant to give the area of the end face of the product, the Constant being proportional to the spacing between the sampling points;
    (5) multiplying the area signal by the density value signal to give the weight of a slide of the product of unit thickness;
    (6) dividing the numerical target weight value by the unit thickness weight value to obtain a numerical value of the thickness of the cut required to obtain the desired target weight;
    (7) generating a control signal proportional to the numerical value of the thickness required;
    (8) adjusting a cutting means to remove from the measured end face of the material a slide having the desired thickness;
    (9) cutting a slice from the said end face of the product having the desired thickness;
    (10) weighing the slice of product to obtain the actual weight of the cut;
    (11) comparing the actual weight with the target weight and producing from the comparison a feedback signal indicating whether the density parameter utilized in the computation of the thickness was correct, and

(12) where a correction in the density value is required, updating the density value in the computing means and restoring same for use in subsequent depth-of-cut computations.

11. A method as set forth in claim 10 wherein the product is moved on a closed path and is driven through a non-slip drive, whereby the movement of the product in a direction perpendicular to the direction of height measurement can be obtained by measuring the angular movement of the drive to the product.

* * * * *